United States Patent [19]
Fries et al.

[11] 3,824,395
[45] July 16, 1974

[54] RADIOMETRIC ASSAY OF PARTICULATE MATTER IN FLUIDS

[75] Inventors: Bernard A. Fries, Orinda; Charles K. Parker, Berkeley, both of Calif.

[73] Assignee: Chevron Research Company, San Francisco, Calif.

[22] Filed: Jan. 28, 1972

[21] Appl. No.: 221,664

[52] U.S. Cl. .............................. 250/308, 250/358
[51] Int. Cl. ............................................ G01t 1/18
[58] Field of Search........... 250/43.5 D, 43.5 MR, 250/83.6 FT, 83.3 D, 83.5 A, 106 T, 250/308, 358

[56] References Cited
UNITED STATES PATENTS

| | | | |
|---|---|---|---|
| 2,660,678 | 11/1953 | Sigworth et al. ................. | 250/106 T |
| 3,019,336 | 1/1962 | Johns ......................... | 250/83.3 D X |
| 3,291,986 | 12/1966 | Lamb ..................... | 250/43.5 MR X |
| 3,319,067 | 5/1967 | Joffe et al. ................... | 250/83.3 D X |
| 3,575,691 | 4/1971 | Pollard et al. ........... | 250/43.5 AR X |

Primary Examiner—James W. Lawrence
Assistant Examiner—Davis L. Willis
Attorney, Agent, or Firm—G. F. Magdeburger; C. J. Tonkin; S. R. La Paglia

[57] ABSTRACT

A porous filtering medium is rendered radioactive by incorporation of a radioactive isotope within it, or by coating it with an insoluble radioactive isotope, having weakly penetrating radiation. This source of radioactivity is first counted. The fluid to be assayed is then filtered through the filtering medium and the attenuation of radiation due to collected solid material is proportional to the amount of particulate matter in the filtered fluid. The method may be automated and assays made continuously.

6 Claims, 1 Drawing Figure

FILTRATION AND COUNTING ASSEMBLY

3 GEIGER TUBE
DRY AIR
6 FILTER PAPER
7 FRITTED GLASS
VACUUM

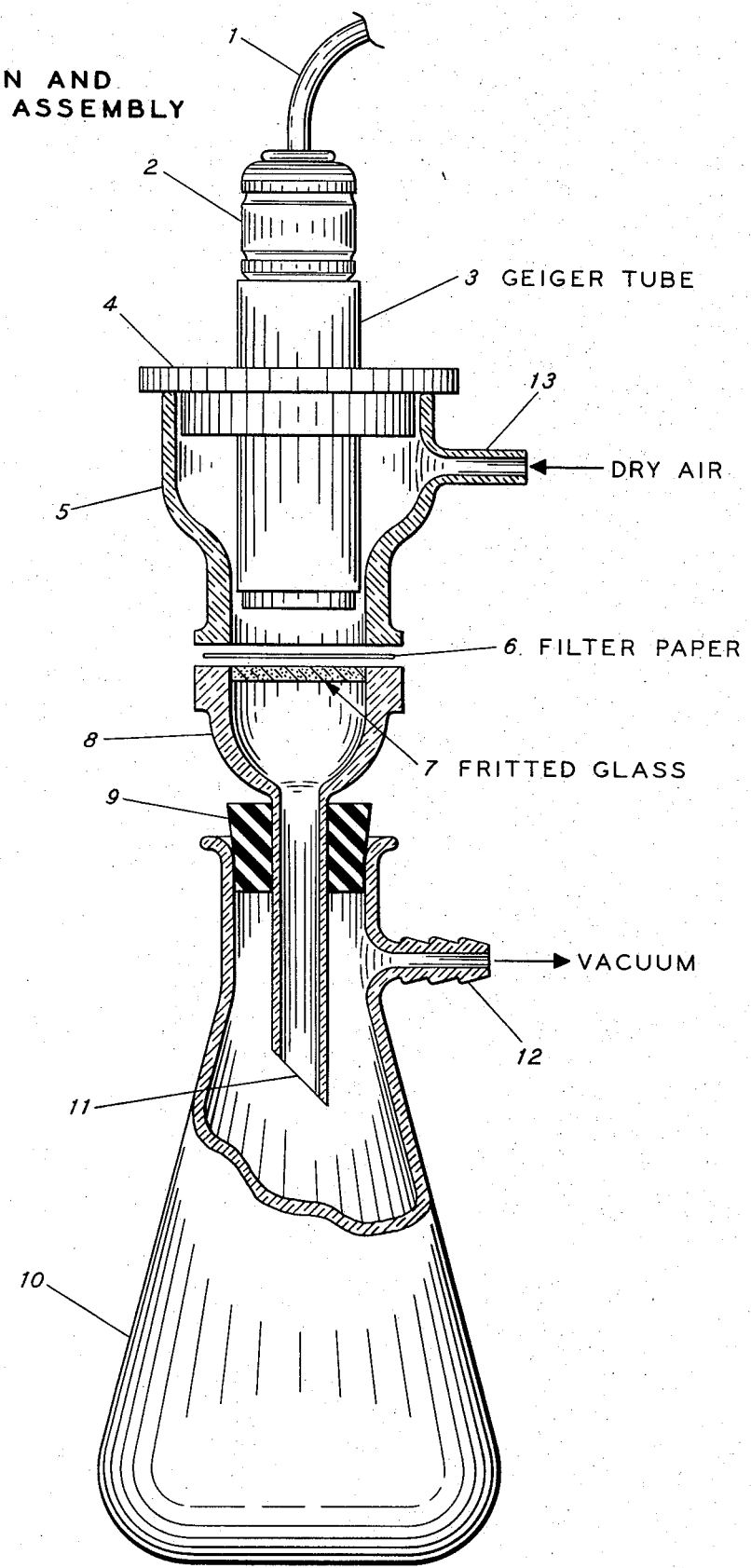
FILTRATION AND COUNTING ASSEMBLY

RADIOMETRIC ASSAY OF PARTICULATE MATTER IN FLUIDS

BACKGROUND OF THE INVENTION

Field of the Invention

Two general methods utilizing ionizing radiation have been proposed to measure the thickness and density of sheets, walls and other materials. These are the reflection method, in which radiation is detected after reflection from the material whose thickness is to be determined, and the transmission method, in which unabsorbed radiation is detected after having traversed the same material. The present invention utilizes the transmission method in a novel radiometric assay technique for particulates in a fluid.

Particulate matter in fluids may be separated by filtering the fluid on a filtering medium of the correct porosity. In a time-consuming procedure, the particulate material may be collected and weighed on a balance. In the method of the present invention, the weight of the particulate material accumulated is determined quickly, easily, and continuously, if desired, by monitoring the amount of radiation transmitted through the filter. Examples of such use are in the determination of the amount of particulate matter in the atmosphere at a given altitude, or the determination of the amount of particulate matter in lubrication oils after continued use, or in the assay of filterable lead halide emissions from automobile engines.

SUMMARY OF THE INVENTION

A porous filtering medium or support is rendered radioactive by incorporating within it a radioactive isotope, or by coating same with an insoluble radioactive isotope, having weakly penetrating radiation. The porous filtering medium or support acts as a source of radioactivity which may be counted directly or with a filter paper, or other filtering medium, in position over the source. The fluid to be assayed is then filtered through the filtering medium and the filtered material may be washed and dried before the counting is repeated. The amount of attenuation of the radioactivity between the first and second counting is proportional to the weight of the particulate matter accumulated. A quantitative measure of the weight of particulate is obtained by utilizing a calibration curve for the particulate material or a chemically similar substance and for the particular geometry of the apparatus. The calibration curve plots counting rate (or the ratio of the counting rates before and after the deposition of particulate) versus weight of particulate accumulated over the range of weights desired.

DETAILED DESCRIPTION OF THE INVENTION

This invention relates to a method of making a radiometric assay of particulate matter in a fluid and a particular piece of apparatus comprising a radioactive filtering medium or support useful in accomplishing this objective.

By particulate matter is meant filterable solids present in fluids (gases or liquid). The basic apparatus used in the method comprises a filtering medium or support which has been rendered radioactive either by incorporation of a radioactive isotope or by being coated with a radioactive isotope in a chemical form which is insoluble in the fluid containing the particulate matter to be assayed.

The radioactive isotope may be incorporated into the filtering medium by, for example, doping the glass used to make a fritted glass filter plate with radioactive isotope, or by similarly doping a ceramic filter. The filtering medium or support acts as a source of radiation and will be so referred to in the following. The source may be adapted to receiving an additional filtering medium such as a filter paper. To achieve the desired sensitivity for detecting small amounts of particulate matter, the radioactive isotope should emit weakly penetrating radiation, specifically beta radiation. $Pm^{147}$ has been found to be a satisfactory radioactive isotope for the purposes of this invention. Other suitable radioisotopes with convenient half-lives and prominent beta radiation include $C^{14}$, $S^{35}$, $Cl^{36}$, $Ca^{45}$, $Ni^{63}$, $Sr^{89}$, $Sr^{90}$-$Y^{90}$, $Tc^{99}$, $W^{185}$, $Tl^{204}$, etc.

The remainder of the apparatus comprises a means for drawing the fluid through the filter such as a vacuum pump, or a suction flask, and a detecting device such as a Geiger tube and counter.

The FIGURE shows a filtration and counting assembly illustrative of equipment capable of utilizing the method of the present invention. The assembly shows dry air being sampled for particulate matter by filtration through a filter paper and fritted glass plate impregnated with $Pm^{147}$. As described, the Geiger tube is shown positioned over the filter in order to receive radioactive emanations from the $Pm^{147}$ isotope.

1 is the lead from the Geiger tube to the counter, 2 is the connector from the lead to the Geiger tube, 3 is the Geiger tube, 4 is a solid support which positions the Geiger tube directly over the filter at a fixed distance therefrom, 5 is part of the glass funnel assembly, 6 is the filter paper shown in a slightly exploded view, 7 is a fritted glass plate impregnated with $Pm^{147}$, 8 is a glass funnel, 9 is a rubber or cork stopper, 10 is a glass funnel, 11 is the inlet into the funnel for filtered material, 12 is the outlet through which a vacuum is pulled to expedite filtration, and 13 is the inlet for dry air containing the particulate to be collected on the filter paper.

In the practice of this method in a quantitative determination of the amount of particulate in the fluid, it is advisable to use a calibration curve which is established as in the following example. It is a desired property of beta radiation that its attenuation is essentially independent of the chemical nature or atomic number of the absorbing material. This property is shared only with very energetic gamma rays (greater than about 1 million electron volts), but gamma rays are not suitable for detecting small amounts of particulate matter within the purposes of the present invention. Exceptions to this independence from chemical composition are found for the lightest element, hydrogen, and for very heavy elements, although small effects are observed for the intermediate elements. Accordingly, if the particulate matter is known to contain substantial amounts of hydrogen, then the calibration should be carried out with a material of similar composition, for example, polystyrene or cellophane. Similarly, if appreciable amounts of iron or lead will be present, the suitable calibrating medium should be used. Because of the very great dependence of attenuation on chemical composition exhibited by x-rays and low-energy gamma rays, radioisotopes emitting substantial amounts of x- and gamma rays cannot be employed.

Since the intensity of radiation reaching the detector depends on the inverse square of the distance between the source and the detector, it is essential to keep this distance constant, or correct for such changes, when making comparable measurements.

Example 1

As an example of the preparation of a radioactive filter support, to a fritted glass plate which was an integral part of a glass funnel was added a few drops of a dilute solution of $PmCl_3$ in HCl containing a few microcuries of $Pm^{147}$ per milliliter. The $Pm^{147}$ as received from Oak Ridge National Laboratory has a very high specific activity (about 900 curies per gram), so that the amount used has an insignificant weight and does not affect the filtration properties of the filter. The drops of dilute $PmCl_3$ were evenly added over the plate to ensure a uniform distribution of the radioactivity on the surface. The still-moist funnel assembly was then exposed to fumes of ammonia to neutralize the HCl and to convert the $PmCl_3$ to $Pm(OH)_3$. The funnel was then placed in a cold oven and slowly warmed to 200°C. to drive off moisture and to convert the $Pm(OH)_3$ to very insoluble $Pm_2O_3$. The source was then ready for use.

Example 2

The apparatus was set up exactly as it was to be employed for actual measurements (see FIGURE). An initial count rate was taken without an added absorbing material, then a series of measurements were made with a series of known absorber thicknesses. The thickness may be expressed in units of surface density, $mg/cm^2$, or for the known area of the surface, directly in mg. A table relating a counting rate versus weight is constructed. In the following typical example, the source was a fritted glass disk coated with $Pm^{147}$, the detector was a mica end-window Geiger tube and the absorbers were a series of filter papers.

TABLE I

| Weight of Absorber mg | Corrected Count Rate Counts/Second | Normalized Count Rate % |
|---|---|---|
| 0 | 138.4 | 100 |
| 48.1 | 68.3 | 49.3 |
| 98.0 | 30.9 | 22.3 |
| 146 | 13.0 | 9.39 |
| 194 | 5.59 | 4.04 |
| 238 | 2.14 | 1.55 |

The count rate shown in Table I was corrected for the background count rate and coincidence counting losses, in accordance with usual procedures. A plot of the values of col. 1 (mg) versus the logarithm of the values of col. 3 (%) of Table I provided a linear calibration curve from which unknown amounts of particulate matter were determined.

Example 3

As an example of the measurements of particulate matter in a used railroad locomotive lubricating oil, the desired porosity grade of filter paper was placed on top of the radioactive glass filter plate and a Whatman glass fiber filter paper was placed on top of the filter paper. The Geiger tube was then placed in the funnel in its counting position and the initial count was taken. The tube was removed and the funnel was now ready for filtering. The oil sample was prepared with a diluent coagulating solution in a modification of ASTM D 893-89. A weighed amount of oil (up to 2 ml) was mixed with 100 ml of diluent made by blending 50 ml of coagulant (2,2'-butyliminodiethanol), 50 ml of isopropanol and 900 ml of pentane. After standing for several minutes, the solution was filtered through the funnel and filter by applying suction. The funnel was then washed successively with rinses of pentane. Air was then sucked through the funnel to evaporate all the solvent. The counter tube was replaced in the funnel and the final count was taken. The ratio of the final to the initial count was calculated and used with the calibration curve to determine the weight of coagulated oil sediment. A typical determination is as follows.

Example 4

An engine oil sample weighing 1,800.8 mg was taken and a filter paper with 1.0 micron-size pores was employed. The oil was added to 100 ml of pentane coagulant solution and permitted to stand for 5 minutes before filtering. After filtration, the residue was washed three times with 10 ml portions of pure pentane. Air was sucked through the filter for 2 minutes and the final count was taken. The initial count was 29.76 counts per second, the final count was 20.25 counts per second. The ratio of these was 68.0 percent, corresponding to a weight of 25.4 mg of particulate matter or 1.41 percent of the original oil sample.

Example 5

To monitor particulate matter in an airstream, the apparatus is assembled and calibrated in the same way (see FIGURE). The porosity of the filter medium is chosen to entrap the desired size of airborne particulate. A stream of the air to be analyzed is drawn through the filter at a metered rate. The quantity of air can be measured conveniently on the effluent from the filter with either a flow-meter or an integrating-type meter. When the desired sample has been drawn through the filter, the flow is interrupted and the filter counted as before. Alternatively, the counter can be left in place and the count rate followed continuously. The signal from the counter can be amplified by the usual means and used to actuate a recorder, alarms, etc. The only attention required is periodic changing of the filter paper.

Possible uses of this invention in monitoring particulate matter in air, such as in pollution studies, is self-evident. The examples have been chosen to be illustrative rather than limiting and the scope of the invention is defined solely by limitations of the following claims.

We claim:

1. A method of making radiometric assay of particulate matter in a fluid comprising the steps of
providing a filter, source of radioactivity, and a detecting device for radiation emanating from said source, making a first measurement of the amount of radiation emanating from said source of radioactivity which penetrates said filter by means of said detecting device,
filtering a fluid containing particulate matter through said filter,
collecting the particulate matter as a solid on said filter, and
making a second measurement of the amount of radiation emanating from said source of radioactivity which penetrates said solid and said filter under the same conditions as the first measurement, the change in the amount of radiation detected between the first and second measurements being related to the amount of particulate collected.

2. The method of claim 1, including the steps of positioning said filter between and adjacent to said source of radioactivity and said detecting device, and monitoring by means of said detecting device the amount of radiation emanating from said source of radioactivity which penetrates said solid and said filter.

3. The method of claim 2, including the additional steps of monitoring the amount of radiation continuously.

4. An apparatus for making a radiometric assay of particulate matter in a fluid comprising;

a filter means, an influent side to said filter means to which particulate matter is collected from a fluid as a solid, an effluent side to said filter means from which filtered fluid exits, a source of radioactivity adjacent to said effluent side, and a detecting means for radioactivity adjacent to said influent side and operably disposed to detect radioactive emanations which penetrate said filter means and solid.

5. An apparatus according to claim 4, wherein the source of radioactivity consists of a radioactive isotope with weakly penetrating radiation, the filter means comprises a porous filtering medium and said radioactive isotope is combined with said filtering medium.

6. An apparatus according to claim 5, in which the porous filtering medium is a fritted glass plate, the radioactive isotope is $Pm^{147}$ and said isotope is coated on said fritted glass plate.

* * * * *